United States Patent
Ishikawa

(10) Patent No.: US 6,680,905 B1
(45) Date of Patent: Jan. 20, 2004

(54) TRANSFER PATH CONTROL SYSTEM

(75) Inventor: Taichi Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/351,346

(22) Filed: Jul. 12, 1999

(30) Foreign Application Priority Data

Oct. 21, 1998 (JP) .......................................... 10-299280

(51) Int. Cl.[7] ................................................ H04L 1/22
(52) U.S. Cl. ...................................... 370/228; 370/225
(58) Field of Search ................................ 370/217, 218, 370/225, 226, 227, 228, 503, 504, 506, 507, 508, 516, 517, 519

(56) References Cited

U.S. PATENT DOCUMENTS

| | | | |
|---|---|---|---|
| 5,335,223 A | * 8/1994 | Iino | 370/503 |
| 5,631,896 A | * 5/1997 | Kawase et al. | 370/228 |
| 5,825,821 A | * 10/1998 | Okuyama | 370/228 |
| 6,163,526 A | * 12/2000 | Egoshi | 370/228 |
| 6,246,668 B1 | * 6/2001 | Kusyk | 370/228 |

FOREIGN PATENT DOCUMENTS

| | | |
|---|---|---|
| JP | 1-264427 | 10/1989 |
| JP | 3-68228 | 3/1994 |
| JP | 07095226 | 4/1995 |
| JP | 10098489 | 4/1998 |
| JP | 10303960 | 11/1998 |

* cited by examiner

*Primary Examiner*—Wellington Chin
*Assistant Examiner*—William Schaltz
(74) *Attorney, Agent, or Firm*—Katten Muchin Zavis Rosenman

(57) ABSTRACT

A transfer path control system has a first transfer device and a second transfer device connected through a first transfer path and a second transfer path to the first transfer device. The first transfer device has an adding unit adding index data to data transmitted to the first and second transfer paths. The second transfer device has a selection unit, to which the data transferred through the first and second transfer paths are given, transmitting only the data corresponding to the transfer path selected from the first and second transfer paths, a first detecting unit detecting the index data from the data having arrived through the first transfer path, a second detecting unit detecting the index data from the data having arrived through the second transfer path, a phase difference detecting unit detecting a phase difference between the first and second transfer paths on the basis of the index data detected, and a judging unit judging whether or not the phase difference detected falls within such an allowable value that the one transfer path selected can be instantaneously switched over to another transfer path.

15 Claims, 14 Drawing Sheets

Fig 13
PRIOR ART
(a)
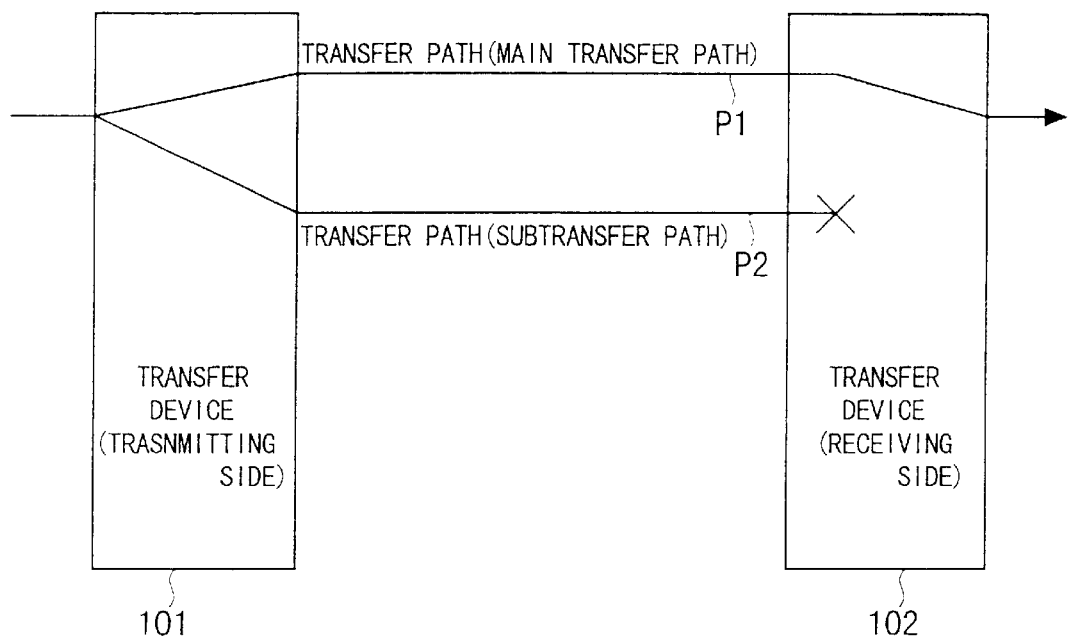
(b)
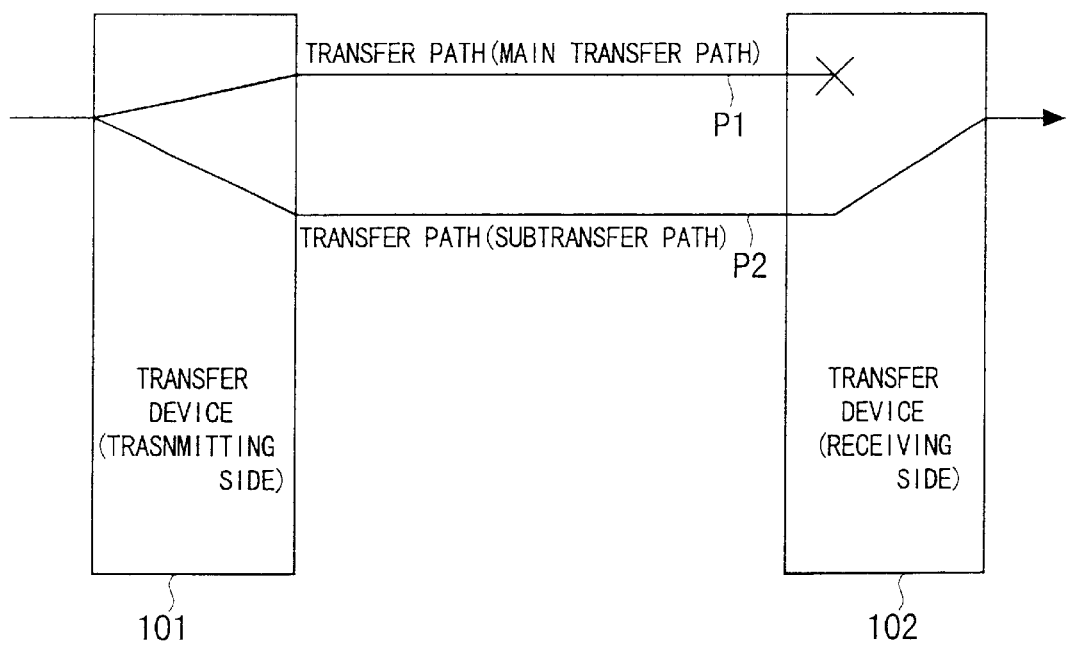

TRANSFER PATH CONTROL SYSTEM

BACKGROUND OF THE INVENTION

The present invention relates to a transfer path control system comprising two transfer devices connected to each other through two transfer paths consisting of a main transfer path (working line) and a sub-transfer path (protection line).

A dual transfer system has hither to been proposed in order to ensure a reliability of data transfer paths. The dual transfer system has an architecture, which will hereinafter roughly be explained. To be specific, as shown in FIG. 13(a), two transfer devices 101, 102 are connected to each other through two transfer paths P1, P2. For example, the transfer path P1 is used as a main transfer path, while the transfer path P2 is used sub-transfer path. The transfer device 101 on a transmitting side transmits the same data substantially simultaneously from the transfer paths P1, P2. The transfer device 102 on a receiving side, when receiving through the transfer paths P1, P2 the communications data transmitted from the transfer device 101, transfers only the data received through the transfer path P1 used as the main transfer path toward still another transfer device (not shown) disposed downstream, and discards the data received through the transfer path P2.

For instance, if an accident happens on the transfer path P1, the transfer device 102 is unable to receive the data through the transfer path P1 from the transfer device 101. Then the transfer device 102, as shown in FIG. 13(b), switches the main transfer path from the transfer path P1 to the transfer path P2. The transfer device thereafter, transfers to another transfer device the data received through the transfer path P2. The reliability of the data transfer paths is thereby ensured.

In the example given above, for instance, if the accident occurs on the transfer path P1, the main transfer path is instantaneously switched over from the transfer path P1 to the transfer path P2. It is therefore required that each piece of data transferred through the transfer path P1 and the transfer path P2 be synchronized.

More specifically, if the data transferred through the transfer path P2 is received earlier by the transfer device 102 than the data transferred through the transfer path P1, missing of data might happen when the transfer path P2 becomes the main transfer path instead of the transfer path P1. On the other hand, if the data transferred through the transfer path P2 is received later by the transfer device 102 than the data transferred through the transfer path P1, duplication of data might happen when the transfer path P2 becomes the main transfer path instead of the transfer path P1. The missing of data and the duplication of data must be strictly avoided because of inducing a decline of quality of communications.

A data delay difference is, however, to occur depending on a difference in terms of transfer path length between the transfer paths P1 and P2, and a difference in status between the transfer paths P1 and P2. Such being the case, there are proposed some systems for obviating the data delay difference. FIG. 14 is a diagram showing a structure of the prior art transfer path control system containing a structural contrivance for obviating the data delay difference. FIG. 15 is an explanatory diagram of the transfer path control system shown in FIG. 14.

Referring to FIG. 14, the transfer devices 101, 102 are connected to each other through the transfer paths P1, P2, in which case the transfer device 101 stores a predetermined sequence number in a field called a J1 byte of an overhead of communications data (e.g., an SDH frame) transmitted through the transfer paths P1, P2 to the transfer device 102. Thereafter, the transfer device 102 through the transfer paths P1, P2, receives the data.

In the transfer device 102, each of detectors 105, 106 detects the content (the sequence number) of the J1 byte from the data transferred through the transfer paths P1, P2, and notifies a phase controller 107 of this sequence number. At this time, if a delay difference t (a difference between the sequence numbers) as shown in FIG. 15(a) occurs with respect to the same communications data between the transfer path P1 and the transfer path P2, the communications data are stored in a memory 108 and a memory 109, respectively. Then, the phase controller 107 reads the communications data simultaneously from the memories 108, 109 and transmits the data, whereby the same communications data are substantially simultaneously given to a selector 110. The delay difference t is thereby obviated. Thereafter, the selector 110 transmits only the communications data corresponding to the transfer path selected by the selector 110 itself. For example, if the transfer path P1 is selected, the selector 110 transmits only the data given from the memory 108.

There has existed in recent years a case where complicated transfer paths must be set in constructing the network system. For example, a new transfer path is build up in some cases for enhancing the reliability of the transfer paths, which have already been built up and operated. Alternatively, a new transfer path is build up as the case may be for altering the transfer paths that have already been built up and operated. In the case of building up the new transfer path, it must be necessary to try to see whether or not an accident happens when switching over the transfer path from the old one to the new.

There arise, however, the following problems inherent in the prior art of the transfer path control system illustrated in FIG. 14. That is, if a delay difference (a phase difference) between the transfer path P1 and the transfer path P2 is small, the communications data are stored in the memories 108, 109, and the same communications data are read therefrom simultaneous, thus obviating the delay difference (the phase difference). By contrast, if the delay difference (the phase difference) is large, capacities of the memories 108, 109 are limited, and hence one of the memories is saturated with the communications data before the same data are stored in the respective memories 108, 109, with the result that the missing of data occurs due to an overflow from the memory in some cases.

The prior art transfer path control system does not, however, have a construction for recognizing a result of switching over the main transfer path before the main transfer path is in fact switched over (before executing a switching operation of the selector 110 shown in FIG. 14). The operation of building up the new transfer path must be therefore conducted with great prudence in order not to cause the above problem, which is a troublesome part of the operation.

SUMMARY OF THE INVENTION

It is a primary object of the present invention to provide a transfer path control system capable of recognizing a result of switching before switching over a transfer path from a first transfer path to a second transfer path, and of, with this recognition, facilitating an operation of building up a new transfer path.

To accomplish the above object, the present invention adopts the constructions that follow.

According to a first aspect of the present invention, a transfer path control system comprises a first transfer device, and a second transfer device connected to the first transfer device through a first transfer path and a second transfer path for transferring the same data. The first transfer device comprises an index data adding unit adding index data to each piece of data transmitted to the first transfer path and the second transfer path. The second transfer device comprises a selection unit selecting one of the first transfer path and the second transfer path and, when receiving the same data through the first transfer path and the second transfer path, transmitting only the communications data corresponding to the selected transfer path, a first detecting unit detecting the index data from the communications data having arrived at the second transfer device through the first transfer path, a second detecting unit detecting the index data from the data having arrived at the second transfer device through the second transfer path, a phase difference detecting unit detecting a phase difference between the first transfer path and the second transfer path on the basis of respective pieces of index data detected by the first detecting unit and the second detecting unit, and a judging unit judging whether or not the one transfer path selected by the selection unit can be switched over to another transfer path in accordance with the phase difference detected by the phase difference detecting unit.

According to the first aspect of the invention, the judging unit judges using the phase difference whether or not the switching can be done, and it is therefore feasible to know a result of switching before the transfer path to be selected by the selection unit is switched over from the first transfer path to the second transfer path. This facilitates the operation of building up a new transfer path. In the transfer path control system according to the first aspect of the invention, the index data adding unit may add specified index data to the communications data, and the second transfer device may comprise a first time detecting unit detecting, as a first time, a time when the first detecting unit detects the specified index data from the data transferred through the first transfer path, a second time detecting unit detecting, as a second time, a time when the second detecting unit detects the specified index data from the data transferred through the second transfer path, a time difference calculating unit for obtaining a time difference between the first time and the second time, and a time difference storage unit storing the time difference calculated by the time difference calculating unit.

With this configuration, the time difference can be utilized as data when building up the sub-transfer path, whereby the operation of building up the transfer system in the sub-transfer path can be more simplified. Note that it may be another contrivance to judge by use of the time difference whether or not the instantaneously switching can be carried out.

In the transfer path control system according to the first aspect of the invention, the second transfer device may further comprise a switching control unit switching over the transfer path selected by the selection unit to another transfer path only when the judging unit judges that the switch-over can be carried out.

With this construction, the switchover can actually be implemented only when there is no possibility of causing a fault even by switching over the transfer path, so that the operation of building up the transfer path can be properly performed.

In the transfer path control system according to the first aspect of the invention, the switching control unit may operate in accordance with a switching command inputted to the second transfer device.

In the transfer path control system according to the first aspect of the invention, the second transfer device may further comprise a first buffer storing the data having arrived at the second transfer device through the first transfer path, a second buffer storing the data having arrived at the second transfer device through the second transfer path, and a capacity changing unit hanging a capacity of one of the first buffer and the second buffer in accordance with a phase difference detected by the phase difference detecting unit so that the same data stored respectively in the first buffer and the second buffer are substantially simultaneously given to the selection unit.

In the transfer path control system according to the first aspect of the invention, the second transfer device may further comprise a specifying unit specifying, when the same data are transmitted from the first transfer device simultaneously to the first transfer path and the second transfer path, the transfer path through which the same data arrives earlier at the second transfer device, a buffer for storing the data having arrived at the second transfer device through the transfer path specified by the specifying unit, and a capacity changing unit changing, if the same data as the data stored in the buffer arrives at the second transfer device through the transfer path which is not specified by the specifying unit, a capacity of the buffer in accordance with a phase difference detected by the phase difference detecting unit so that the same data having arrived at the second transfer device and the same data stored in the buffer are substantially simultaneously given to the selection unit.

According to a second aspect of the present invention, there is provided a transfer device connected to another transfer device through a first transfer path and a second transfer path for transferring the same data. The transfer device comprises a selection unit selecting one of the first transfer path and the second transfer path and, when receiving the same data from another transfer device through the first transfer path and the second transfer path, transmitting only the data corresponding to the selected transfer path, a first detecting unit detecting index data contained in the data transferred through the first transfer path, a second detecting unit detecting index data contained in the data transferred through the second transfer path, a phase difference detecting unit detecting a phase difference between the first transfer path and the second transfer path on the basis of respective pieces of index data detected by the first detecting unit and the second detecting unit, and a judging unit judging whether or not the one transfer path selected by the selection unit can be switched over to another transfer path in accordance with the phase difference detected by the phase difference detecting unit.

What can be exemplified a variety of transfer devices, e.g., an ATM transfer device used as a node in, e.g., B-ISDN (Broadband Integrated Service Digital Network). Further, the present invention can be applied to a frame relay transfer device.

According to a third aspect of the present invention, there is provided a transfer path control method of a transfer path control system comprising, a first transfer device, and a second transfer device connected to the first transfer device through a first transfer path and a second transfer path for transferring the same data, the second transfer device comprising a selection unit selecting one of the first transfer path and the second transfer path and, when receiving the same data through the first transfer path and the second transfer path, transmitting only the data corresponding to the selected transfer path. The transfer path control method comprises a step of adding index data to respective pieces of data transmitted by the first transfer device to the first transfer path and the second transfer path, a step of detecting the index data from the data having arrived at the second transfer device through the first transfer path, a step of detecting the index data from the data having arrived at the second transfer device through the second transfer path, a step of detecting a phase difference between the first transfer path and the second transfer path on the basis of respective pieces of index data detected, and a step of judging whether or not the one transfer path selected at the present time can be switched over to another transfer path in accordance with the phase difference detected.

The transfer path control method according to the present invention is capable of recognizing a result of switching before switching over the transfer path from the first transfer path to the second transfer path. Hence, it is feasible to facilitate the operation of building up the second transfer path while ensuring a reliability of the data transfer through the first transfer path.

BRIEF DESCRIPTION OF THE DRAWINGS

FIG. 13 is an explanatory diagram showing a dual transfer path system;

DESCRIPTION OF THE PREFERRED EMBODIMENTS

Embodiments of the present invention will hereinafter be described with reference to the accompanying drawings.

Embodiment 1

Figure 1:
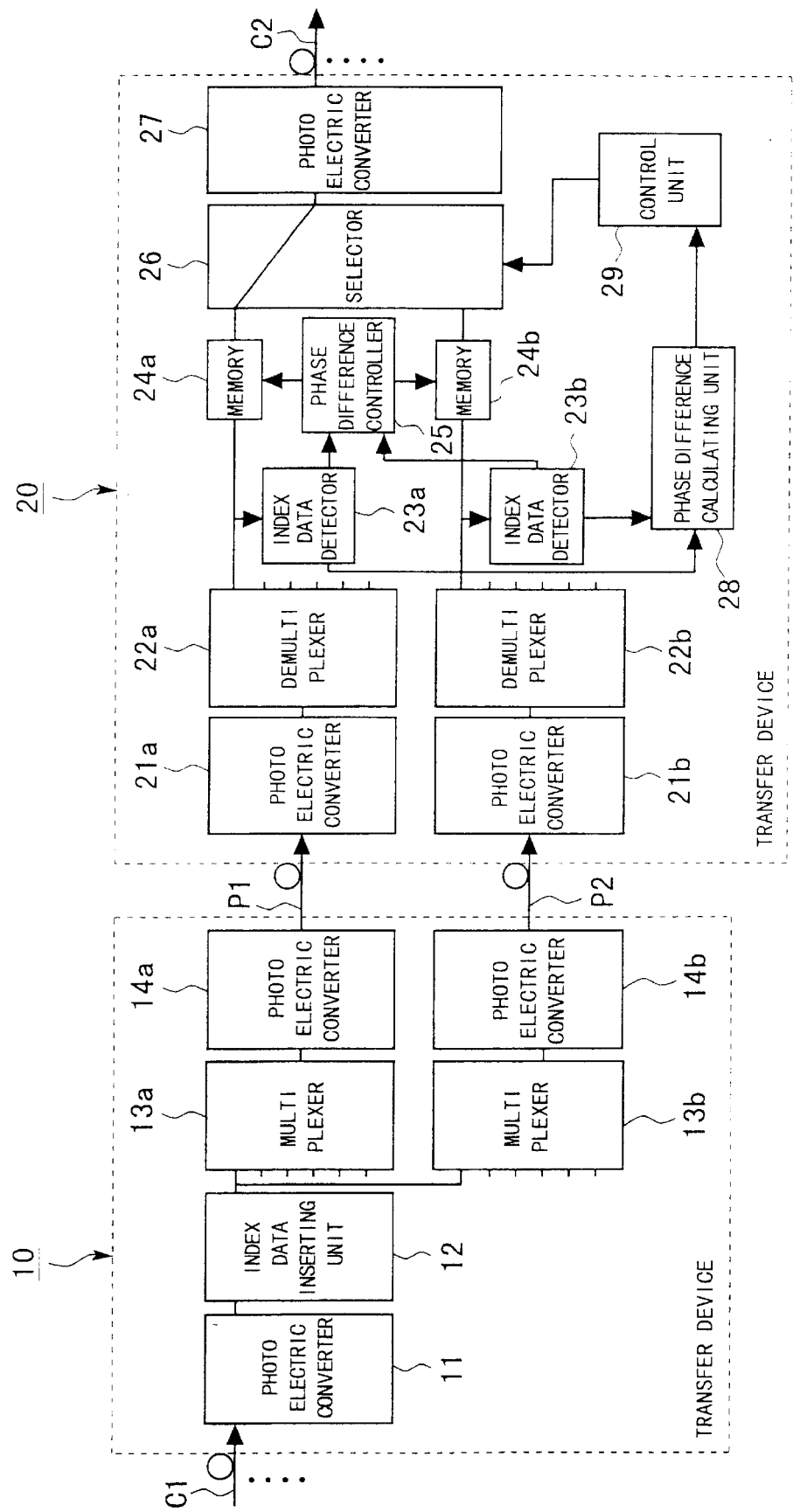
FIG. 1 is a diagram showing a structure of a transfer path control system in an embodiment 1 of the present invention.

FIG. 1 is a diagram showing a structure of a transfer path control system in an embodiment 1 of the present invention. Referring to FIG. 1, the transfer path control system comprises a transfer device 10 and a transfer device 20. The transfer device 10 is connected through transfer paths P1 and P2 to the transfer device 20. Note that FIG. 1 illustrates a case where communications data are transferred from the transfer device 10 to the transfer device 20.

The transfer device 10 is constructed of a photoelectric converter 11 accommodating a low-speed line, an index data inserting unit 12 connected to the photoelectric converter 11, multiplexers 13a, 13b each connected to the index data inserting unit 12, an photoelectric converter 14a connected to the multiplexer 13a, and an photoelectric converter 14b connected to the multiplexer 13b.

The photoelectric converter 11 accommodates an optical fiber cable C1 utilized as a low-speed line. The optical fiber cable C1 serves to transfer an SDH (synchronous digital hierarchy) frame stored with communications data. The photoelectric converter 11 converts a photo signal into an electric signal in terms of a signal format of the SDH frame, and transmits this electric signal.

The index data inserting unit 12 sets a cyclic sequence number as a piece of index data in a field called a J1 byte in an overhead of the SDH frame transmitted from the photoelectric converter 11. Thereafter, the index-inserting unit 12 transmits the SDH frame toward each of the multiplexers 13a, 13b.

The photoelectric converters 11 and the index data inserting units 12 are provided corresponding to the number of optical fiber cables C1 accommodated in the transfer device 10. In the embodiment 1, the transfer device 10 accommodates five lines of optical fiber cables C1, and therefore the photoelectric converters 11 and the index data inserting units 12 are provided by fives, respectively.

The multiplexers 13a, 13b have the same configuration. Each of the multiplexers 13a, 13b multiplexes the SDH frame transmitted from each index data inserting unit 12, and thus transmits the multiplexed SDH frame.

The photoelectric converter 14a converts the electric signal into the photo signal with respect to the multiplexed SDH frame, and transmits the photo signal to the transfer path P1. Similarly, the photoelectric converter 14b converts the electric signal into the photo signal with respect to the multiplexed SDH frame, and transmits the photo signal to the transfer path P2. With the construction described above, the same communications data (the multiplexed SDH frame) are transmitted substantially simultaneously from the photoelectric converters 14a, 14b to the transfer paths P1, P2.

Each of the transfer paths P1, P2 is structured by use of the optical fiber cable utilized as a high-speed line. The respective transfer paths P1, P2 are used as a main transfer path and a sub-transfer path in a duel transfer system. Herein the transfer path P1 is set to the main transfer path (working line), while the transfer path P2 is set to the sub-transfer path (protection line).

The transfer device 20 includes a photoelectric converter 21a connected to the transfer path P1, a photoelectric converter 21b connected to the transfer path P2, a demultiplexer 22a connected to the photoelectric converter 21a, a demultiplexer 22b connected to the photoelectric converter 21b, a memory 24a connected to the demultiplexer 22a, a memory connected to the demultiplexer 22b, a selector 26 connected to each of the memories 24a, 24b, and an photoelectric converter 27 connected to the selector 26.

The transfer device 20 further comprises an index data detector 23a provided between the demultiplexer 22a and the memory 24a, an index data detector 23b provided between the demultiplexer 22b and the memory 24b, a phase difference controller 25 connected to the respective memories 24a, 24b as well as to the index data detectors 23a, 23b, a phase difference calculating unit 28 connected to each of the index data detectors 23a, 23b, and a control unit 29 connected to the selector 26 and the phase difference calculating unit 28 as well.

The photoelectric converter 21a converts the photo signal into the electric signal with respect to the SDH frame received by the transfer device 20 through the transfer path P1, and transmits the electric signal. The photoelectric converter 21b converts the photo signal into the electric signal with respect to the SDH frame received by the transfer device 20 through the transfer path P2, and transmits the electric signal.

The demultiplexer 22a accommodates five lines of low-speed lines. The demultiplexer 22a demultiplexes the multiplexed SDH frame, thereby making the multiplexed SDH frame revert to a status before being multiplexed by the multiplexer 13a. Thereafter, the demultiplexer 22a transmits each SDH frame to the low-speed line corresponding to this SDH frame. The demultiplexer 22b has the same configuration as that of the demultiplexer 22a.

The memory 24a is connected through one of the low-speed lines to the demultiplexer 22a. The memory 24a is temporarily stored with a plurality of SDH frames successively transmitted from the demultiplexer 22a. The SDH frames stored in the memory 24a are read in the sequence of their being stored and transmitted to the selector 26 under the control of the phase difference controller 25. The memory 24b has the same construction as the memory 24a.

The selector 26 transmits to the photoelectric converter 27 one of the SDH frame transmitted from the memory 24a and the SDH frame transmitted from the memory 24b in accordance with a selection made by the control unit 29.

The photoelectric converter 27 accommodates an optical fiber cable C2 utilized as a low-speed line. The photoelectric converter 27 converts the SDH frame transmitted from the selector 26 into a photo signal format, and transmits the photo signal to the optical fiber cable C2.

The index data detector 23a detects a sequence number set in the J1 byte of the SDH frame transferred on the low-speed line for connecting the demultiplexer 22a to the memory 24a, and notifies the phase difference controller 25 and the phase difference calculating unit 28 of this sequence number. Similarly, the index data detector 23b detects a sequence number set in the J1 byte of the SDH frame transferred on the low-speed line for connecting the demultiplexer 22b to the memory 24b, and notifies the phase difference controller 25 and the phase difference calculating unit 28 of this sequence number.

The phase difference controller 25 controls each of the memories 24a, 24b in the manner, which follows. To be specific, each of the memories 24a, 24b is successively stored with the SDH frames transmitted from each of the demultiplexers 22a, 22b. On this occasion, the phase difference controller 25 receives the sequence numbers of the SDH frames stored in the memories 24a, 24b from the index data detectors 23a, 23b. Then, if the identical sequence number is received form the index data detectors 23a, 23b, the phase difference controller 25 controls the reading of the SDH frames so that the SDH frames having the identical sequence number are simultaneously transmitted to the selector 26 from the memories 24a, 24b.

A phase difference between the data transferred on the transfer path P1 (working line) and the data transferred on the transfer path P2 (protection line), is thereby obviated. Thus, the memories 24a, 24b are utilized as buffers for taking synchronism between the data in the working line and the data in the protection line.

The phase difference calculating unit 28 is constructed of an electronic circuit. The phase difference calculating unit 28 receives the sequence numbers set in the J1 bytes of the SDH frames from the index data detectors 23a, 23b, and compares these two sequence numbers, thus calculating a phase difference (a delay phase difference) of the same SDH frame transferred on the transfer paths P1, P2 from a difference between the two sequence numbers. Thereafter, the phase difference calculating unit 28 gives the phase difference to the control unit 29 in a state of being capable of specifying which data on the transfer path P1 or the transfer path P2 is delayed. For example, the phase difference calculating unit 28 gives the control unit 29 the sequence number detected together with data in order to specify the transfer path having delay.

Note that the index data detectors 23a, 23b, the memories 24a, 24b, the phase controllers 25, the selectors 26, the photoelectric converters 27 and the phase difference calculating units 28 are, though not illustrated in FIG. 1, provided corresponding to the number of the low-speed lines (five lines in the embodiment 1) accommodated in each demultiplexer 22a, 22b).

The control unit 29 is constructed mainly of a CPU (Central Processing Unit), and memory devices such as a RAM and a ROM etc, and controls chiefly the memories 24a, 24b and the selector 26 by executing a control program stored in the memory device.

Note that the transfer device 20 described above corresponds to a first transfer device and another transfer device according to the present invention, and the transfer device 20 corresponds to a second transfer device and a transfer device stated otherwise. Further, the index data inserting unit 12 corresponds to an index data adding unit. Moreover, the selector 26 and the control unit 29 correspond to a selecting unit according to the present invention. Still further, the index data detector 23a corresponds to a first detecting unit according to the present invention, and the index data detector 23b corresponds to a second detecting unit according to the present invention. Yet further, the phase difference calculating unit 28 corresponds to a phase difference detecting unit according to the present invention. Moreover, the control unit 29 corresponds to a judging unit and a switching control unit according to the present invention.

Figure 2:
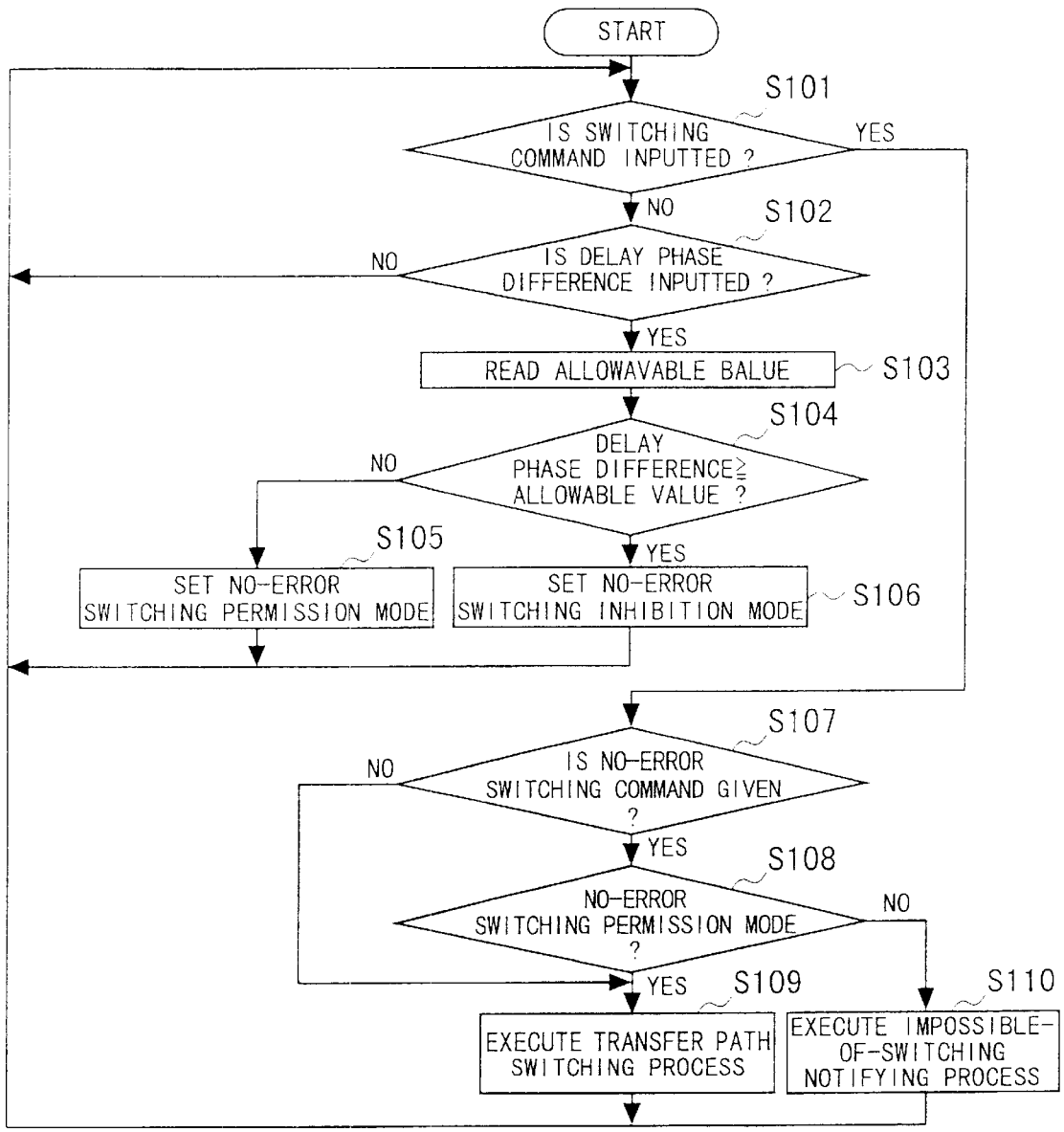
FIG. 2 is a flowchart showing processes executed by a control unit shown in FIG. 1.

FIG. 2 is a flowchart showing processes executed by the control unit 29. The control unit 29, upon switching ON a power source of, e.g., the transfer device 20, starts executing the processes shown in FIG. 2. To begin with, the control unit 29 judges whether or not a switching command of the transfer path is inputted from an unillustrated input device of the transfer device 20 (step S101). At this time, if the switching command is given, the control unit 29 diverts the processing to step S107 and, whereas if not, makes the processing proceed to step S102.

The control unit 29 judges in step S102 whether or not the delay phase difference is inputted from the phase difference calculating unit 28. At this time, if the delay phase difference is not inputted, the control unit 29 returns the processing to step S101. Whereas if the delay phase difference is inputted, the processing proceeds to step S103.

The control unit 29 reads in step S103 an allowable value (a phase difference which can be obviated by the memories 24a, 24b) of the phase difference held beforehand by the control unit 29, and judges (in step S104) whether or not the delay phase difference is the allowable value or larger. If the delay phase difference is over the allowable value, the control unit 29 moves the processing forward to step S106. Whereas if less than the allowable value, the control unit 29 makes the processing proceed to step S105. Herein, the allowable value is set to a phase difference corresponding to a quantity of the data of the SDH frames which can be stored in, e.g., the memories 24a, 24b.

When the processing proceeds to step S105, the control unit 29 sets a processing mode with respect to the switching command, to an "no-error switching permission mode", and loops the processing back to step S101. On the other hand, when the processing proceeds to step S106, the control unit 29 sets the processing mode for the switching command to an "no-error switching inhibition mode", and returns the processing back to step S101.

By contrast, when the processing proceeds to step S107, the control unit 29 judges whether or not the inputted switching command is an no-error switching command. If the switching command is not the no-error switching command, the control unit 29 diverts the processing to step S109 and, whereas if so, advances the processing to step S108.

The control unit 29 judges in step S108 whether or not the mode for the present switching command is the "no-error switching permission mode". The control unit 29, when judging that the mode is the "no-error switching permission mode", advances the processing to S111 and, whereas if not, makes the processing proceed to step S110.

In step S109, the control unit 29 executes a transfer path switching process. More specifically, the control unit 29 changes the transfer path selected at present by the selector 26 to another transfer path. For example, if the selector 26 selects a transfer path P1 at the present and transfers the data transmitted from the memory 24a to the photoelectric converter 27, the selector 26 is switched over so that the selector 26 changes the transfer path to be selected to the transfer path P1 and transfers the data transmitted from the memory 26b to the photoelectric converter 27. This switching process is, if the switching command is judged to be the no-error switching command, executed instantaneously. The transfer path P2 is thereby switched over to the transfer path P1 as a main system (working line). Thereafter, the control unit 29 returns the processing to step S101.

While on the other hand, when the processing advances to step S110, the control unit 29 executes an impossible-of-switching notifying process. To be more specific, the control unit 29, for giving a manager (user) of the transfer device 20 a notification that the switching can not be implemented, causes an unillustrated display device (such as a monitor and an LED etc) or a voice output device (a loudspeaker etc) incorporated into the transfer device 20 to output the effect of being impossible of switching. Thereafter, the control unit 29 returns the processing back to step S101.

<Operation of Embodiment 1>

The following is a description of an operation of the transfer path control system in the embodiment 1. For instance, it is assumed that the transfer path P2 is newly set as a sub-transfer path of the transfer path P1. Thereupon, each of the transfer devices 10, 20 performs the above operations and processes, then detects a phase difference between the transfer path P1 and the transfer path P2, and sets a mode for the switching command in accordance with this phase difference.

Thereafter, when the manager of the transfer device 20 inputs the no-error switching command to the transfer device 20, if the mode is "the no-error switching permission mode", the no-error switching of the selector 26 is carried out. In the case of "the no-error switching inhibition mode", the no-error switching of the selector 26 is not effected. That is, if the phase difference cannot be obviated by the respective memories 24a, 24b, the no-error switching is not executed.

According to the transfer path control system in the embodiment 1, in the case of forming an architecture of the network system such as altering the main transfer path and extending or building up the sub-transfer path, it is feasible to implement the work without exerting any influence upon the reliability of the data transfer in the main transfer path. Namely, it is possible to prevent a problem such as data missing because of having executing the no-error switching of the transfer path. This facilitates the operation of building up the sub-transfer path.

Embodiment 2

Figure 3:
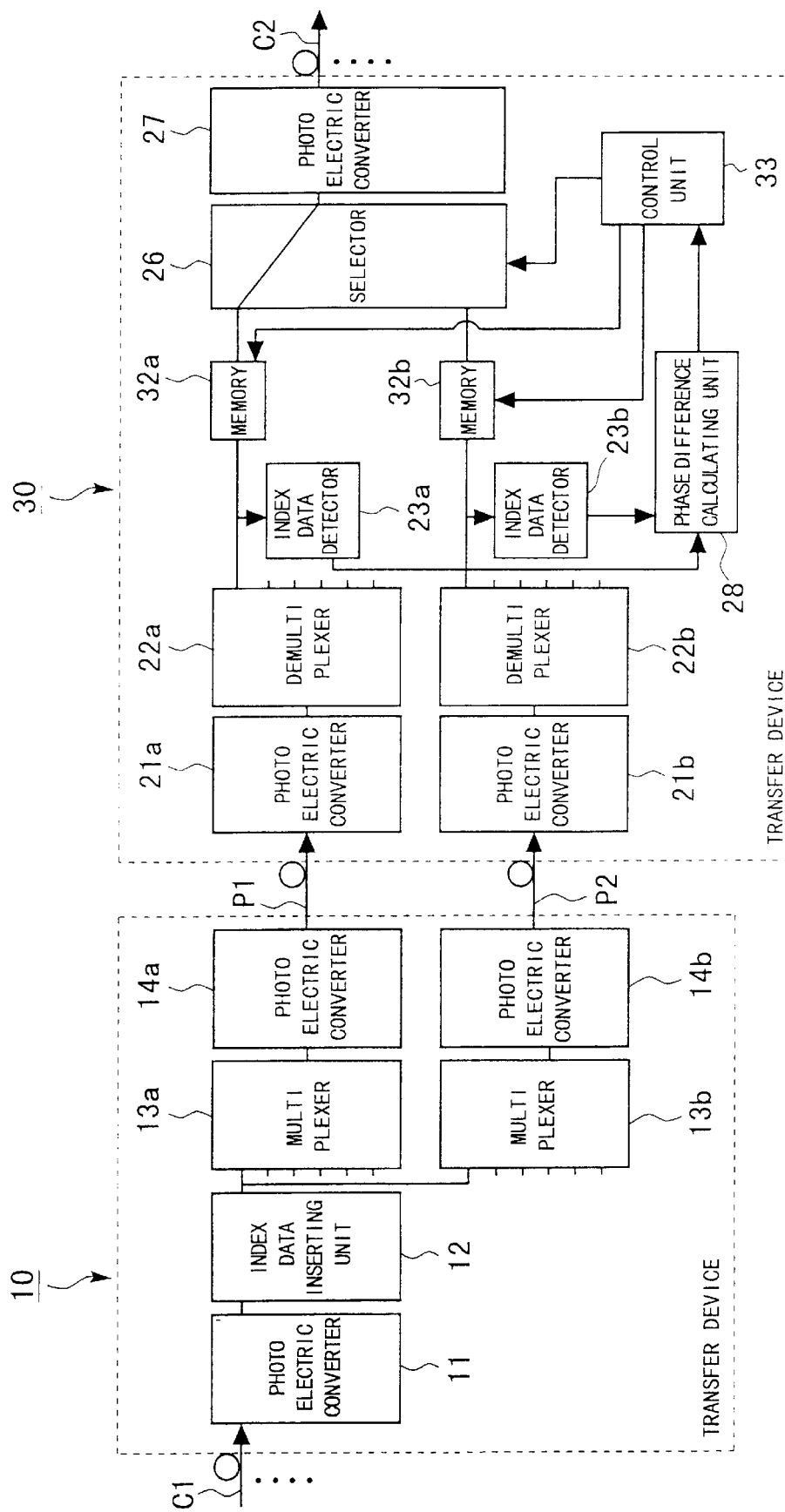
FIG. 3 is a diagram showing a structure of the transfer path control system in an embodiment 2 of the present invention.
Figure 4:
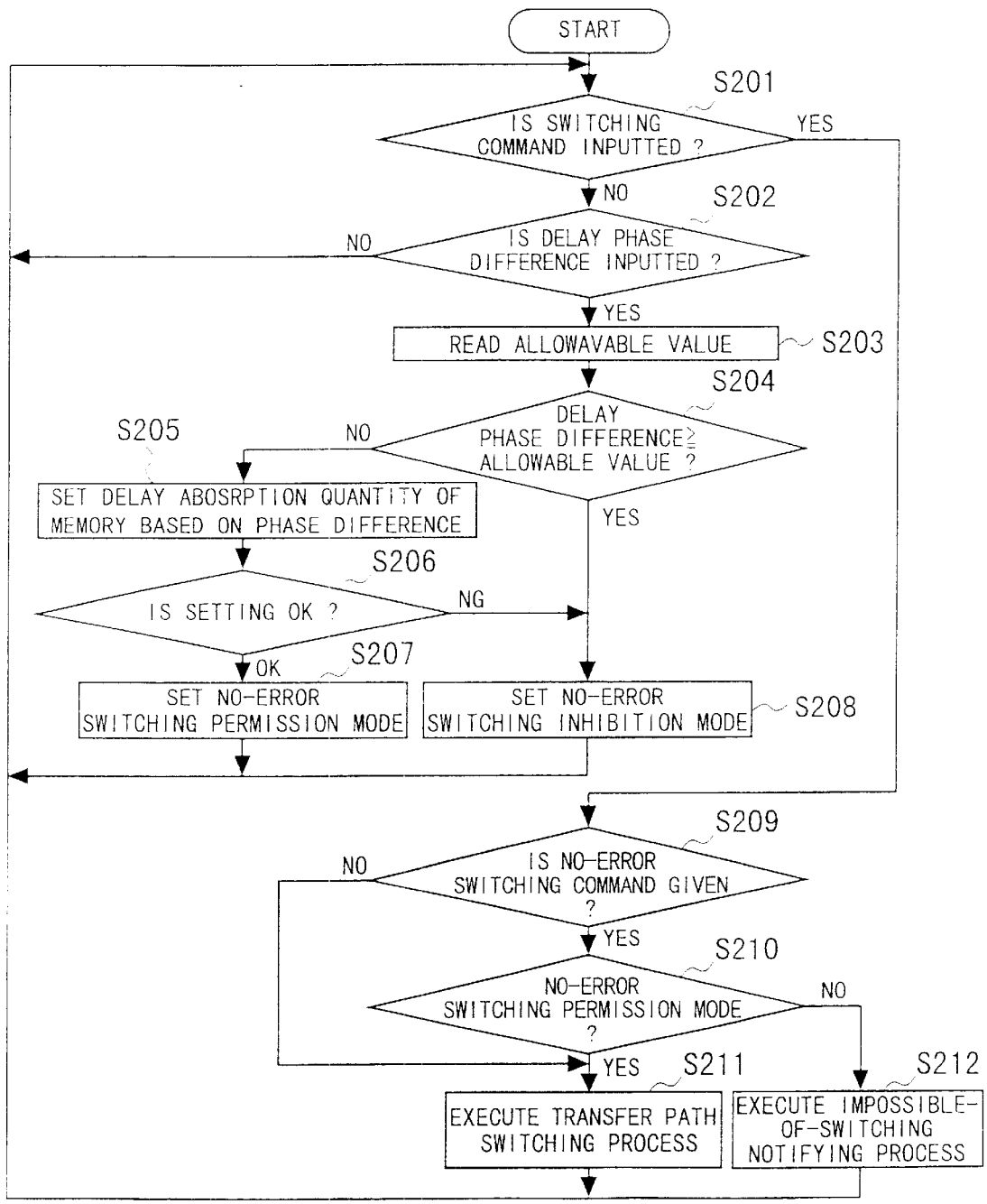
FIG. 4 is a flowchart showing processes executed by a control unit shown in FIG. 3.

FIG. 3 is a diagram showing architecture of the transfer path control system in an embodiment 2 of the present invention. FIG. 4 is a flowchart showing processes executed by a control unit 33 shown in FIG. 3. The transfer path control system in the embodiment 2 is different from the embodiment 1 in terms of the following points.

A transfer device 30 does not include the phase difference controller 25. A capacity (of an effective storage area) of each of memories 32a, 32b is varied corresponding to setting by the control unit 33.

More specifically, as shown in FIG. 4, the control unit 33 sets in step S205 a delay absorption quantity (a storage capacity) of each of the memories 32a, 32b on the basis of a phase difference inputted from the phase difference calculating unit 28. Subsequently in step S206, the control unit 33 judges whether the setting of each of the memories 32a, 32b is OK or NG. If the setting is OK, the processing proceeds to step S207. Whereas if the setting is NG, the processing proceeds to step S208.

The above processing being thus done, the transfer path control system in the embodiment 2 operates in a way that follows. For example, if the data on the transfer path P2 is delayed behind the data on the transfer path P1, the data on the transfer path P1 arrives at the transfer device 30 earlier than the data on the transfer path P2. The control unit 33 therefore sets in step S205 the capacity of the memory 32a larger than the capacity of the memory 32b in accordance with the phase difference.

Thereafter, the SDH frames are transmitted from the demultiplexers 22a, 22b and stored in the memories 32a, 32b. If the SDH frames stored in top locations of the memories 32a, 32b thereafter become identical (if the phase difference is obviated), each of the memories 32a, 32b falls into a saturated state of being unable to store the SDH frame any more. When the SDH frames are thereafter transmitted from the demultiplexers 22a, 22b, the SDH frames stored in the top locations of the memories 32a, 32b are extruded and transferred to the selector 26. The identical SDH frames are thereby given simultaneously to the selector 26. Accordingly, the phase difference controller 25 in the embodiment 1 is therefore unnecessary. Excluding what has been discussed so far, the transfer path control system in the embodiment 2 is substantially the same as the embodiment 1.

Note that the transfer device 30 corresponds to a second transfer device and a transfer device stated otherwise according to the present invention, the control unit 33 and the selector 26 correspond to a selection unit according to the present invention, the control unit 33 corresponds to a judging unit and a capacity changing unit according to the present invention, the memory 32a corresponds to a first buffer according to the present invention, and the memory 32b corresponds to a second buffer according to the present invention.

The transfer path control system in the embodiment 2 exhibits the same effects as those of the transfer path control system in the embodiment 1 and, in addition, an advantage of requiring no phase difference controller 25.

Embodiment 3

Figure 5:
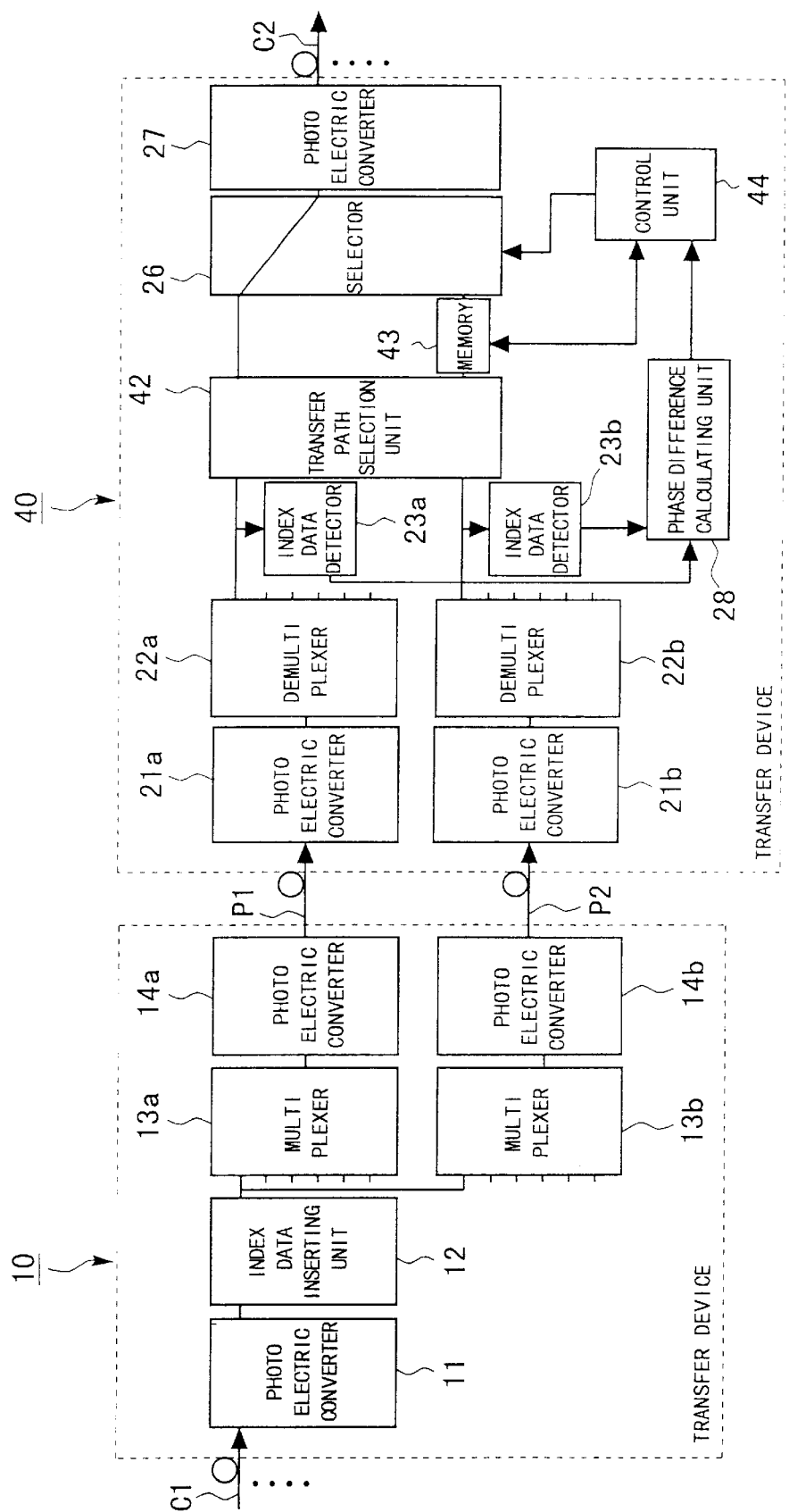
FIG. 5 is a diagram showing a structure of the transfer path control system in an embodiment 3 of the present invention.
Figure 6:
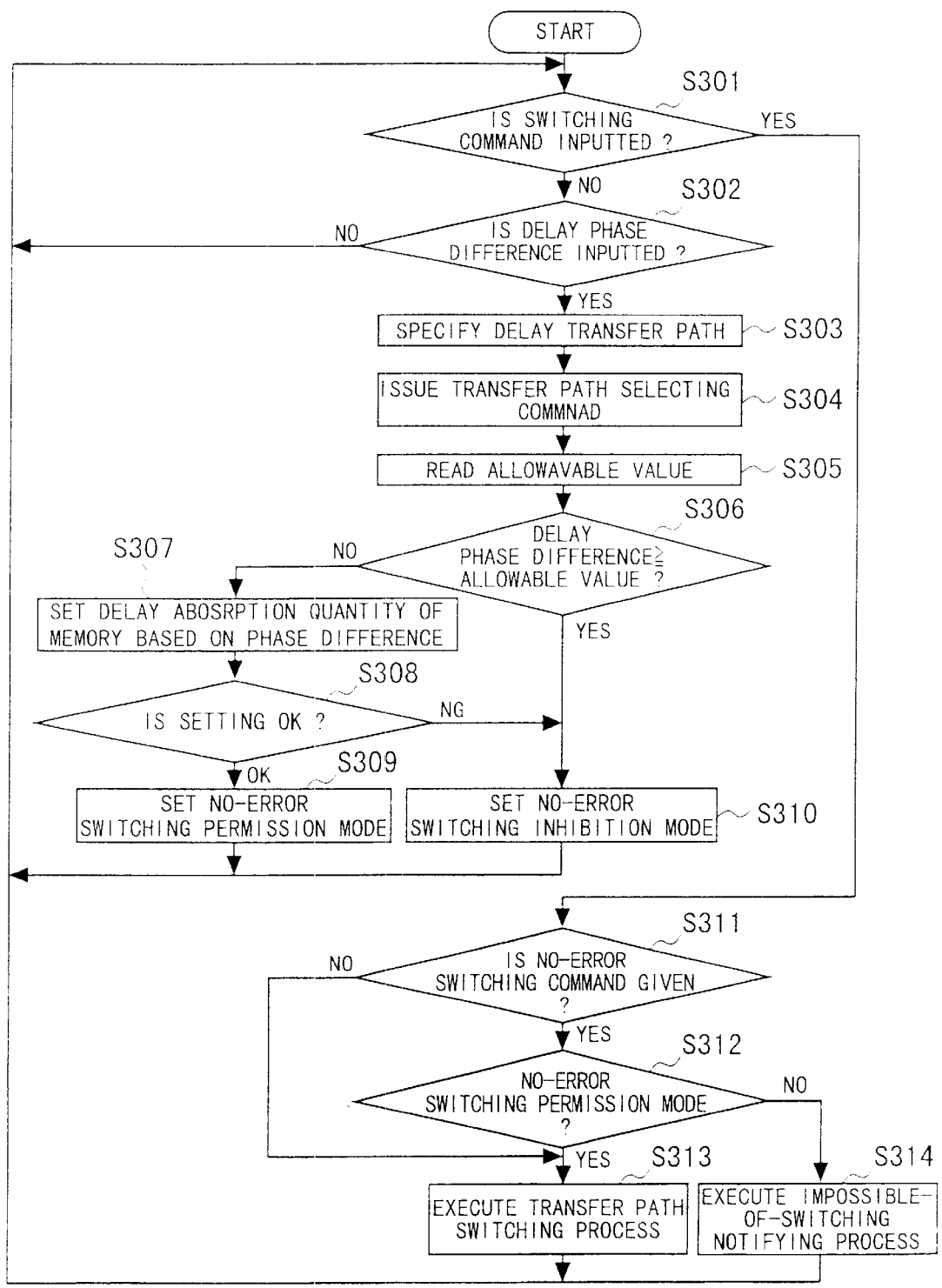
FIG. 6 is a flowchart showing processes executed by a control unit shown in FIG. 5.

FIG. 5 is a diagram showing an architecture of the transfer path control system in an embodiment 3 of the present invention. FIG. 6 is a flowchart showing processes executed by a control unit 34 shown in FIG. 5. The transfer path control system in the embodiment 3 is different from the embodiment 1 in terms of the following points.

As illustrated in FIG. 5, in the embodiment 3, a transfer device 40 is provided as a substitute for the transfer device 20. The transfer device 40 has a transfer path selection unit 42, a memory 43 and a control unit 44 instead of the phase difference controller 25 and the control unit 29. The transfer path selection unit 42 is connected to the demultiplexers 22a, 22b and also connected to the selector 26 and the memory 43. Further, the memory 43 is connected to the selector 26. Then, the control unit 44 is connected to the phase difference calculating unit 28, the transfer path selection unit 42 and the memory 43.

Further, as shown in FIG. 6, the control unit 44, based on a phase difference inputted from the phase difference calculating unit 28, specifies the transfer path on which the transfer of the data is delayed. Thereafter, the control unit 44 issues in step S404 to the transfer path selection unit 42 a transfer selecting command based on a result of having specified the transfer path.

At this time, if the specified transfer path is the transfer path P1, the control unit 44 the transfer path selecting command purporting that the demultiplexer 22a be connected to the selector 26 and the demultiplexer 22b be connected to the memory 43. By contrast, if the specified transfer path is the transfer path P2, the control unit 44 the transfer path selecting command purporting that the demultiplexer 22a be connected to the memory 43 and the demultiplexer 22b be connected to the selector 26. The transfer path selection unit 42 connects the demultiplexer 22a or 22b to the selector 26 or the memory 43 in accordance with the transfer path selecting command received from the control unit 44. Thereafter, the control unit 44 sets in step S307 a capacity of the effective storage area of the memory 43 to a value corresponding to the phase difference.

With the processes described above, the transfer device 40 carries out the following operations. For instance, if the data (the SDH frame) on the transfer path P2 is delayed behind the data on the transfer path P1, the transfer path selection unit 42 connects the demultiplexer 22a to the memory 43 and connects the demultiplexer 22b to the selector 26 in accordance with the transfer path selecting commands received from the control unit 44. Further, the control unit 44 sets the capacity of the effective storage area to the value corresponding to the phase difference. Thereafter, the data (the SDH frames) transmitted from the demultiplexer 22a are stored in the memory 32 via the transfer path selection unit 42.

Then, the same data as the data stored in the top location of the memory 43 is transmitted from the demultiplexer 22b and further transmitted from the transfer path selection unit 42. Simultaneously, the data stored in the top location of the memory 43 is extruded by the data which is to be newly stored in the memory 43, and transmitted toward the selector 26. With this operation, the same data (SDH frames) having the same J1 byte simultaneously arrive at the selector 26. Namely, the phase difference is obviated. Excluding the points that have been described above, the transfer path control system in the embodiment 3 is substantially the same as the transfer path control system in the embodiment 1.

Note that the transfer device 40 shown in FIG. 5 corresponds to a second transfer device and a transfer device stated otherwise according to the present invention, the transfer path selection unit 42 and the control unit correspond to a selection unit according to the present invention. Furthermore, the control unit 44 corresponds to a judging unit and a capacity changing unit according to the present invention, and the memory 43 corresponds to a buffer according to the present invention.

The transfer path control system in the embodiment 3 exhibits substantially the same effects as those of the transfer path control system in the embodiment 1. In addition, there is advantage of requiring no phase control unit 25. There is also advantage that the phase control is executed by using of only one memory.

Embodiment 4

Figure 7:
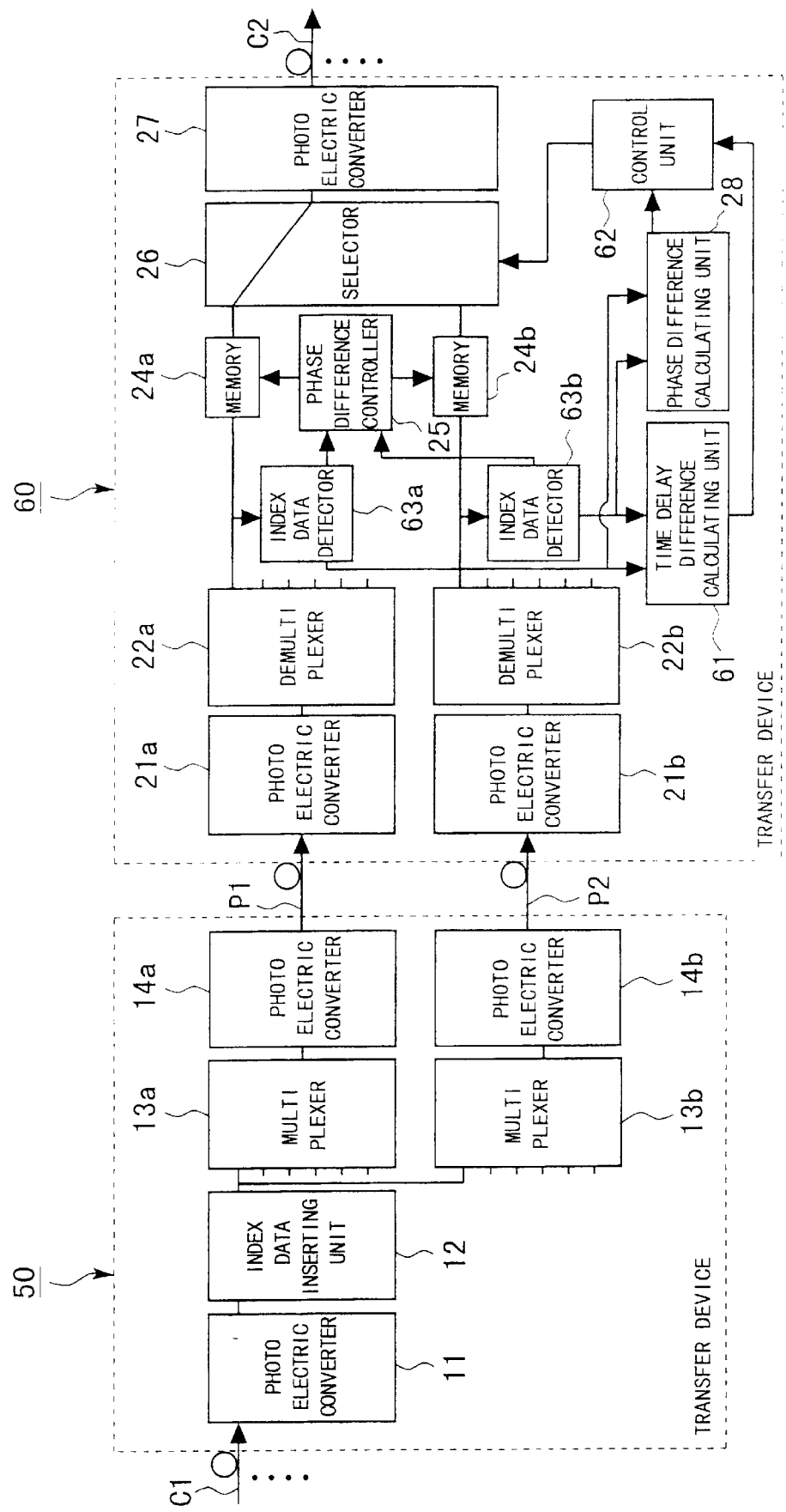
FIG. 7 is a diagram showing a structure of the transfer path control system in an embodiment 4 of the present invention.
Figure 8:
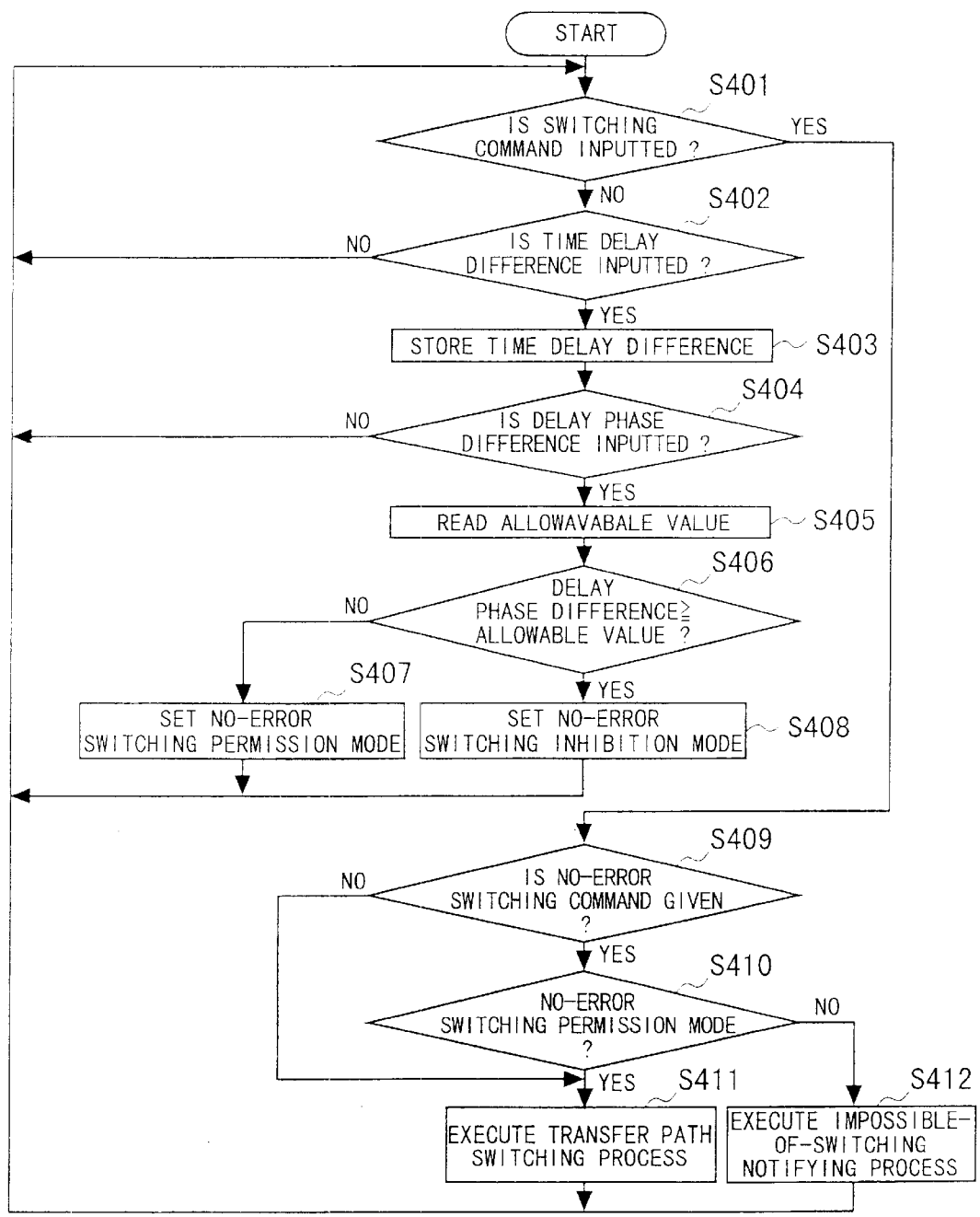
FIG. 8 is a flowchart showing processes executed by a control unit shown in FIG. 7.

FIG. 7 is a diagram showing an architecture of the transfer path control system in an embodiment 4 of the present invention. FIG. 8 is a flowchart showing processes executed by a control unit 62 shown in FIG. 7. The transfer path control system in the embodiment 4 is substantially the same as the transfer path control system in the embodiment 1, excluding the following different points.

As illustrated in FIG. 7, an index data inserting unit 51 of a transfer device 50 sets a predetermined piece of data (a sequence number) A in the J1 byte of a header of the SDH frame at a predetermined time T which has been preset. A transfer device 60 includes index data detectors 63a, 63b, and a time delay difference calculating unit 61 connected to a control unit 62. The index data detector 63a, when detecting the data A (corresponding to "specified data" in the present invention) from the J1 byte of the SDH frame, inputs a detection time Ta (corresponding to a "first time" in the present invention) thereof to the time delay difference calculating unit 61.

Further, the index data detector 63b, when detecting the data A from the J1 byte of the SDH frame, inputs a detection time Ta' (corresponding to a "second time" in the present invention) thereof to the time delay difference calculating unit 61. The time delay difference calculating unit 61 obtains a difference between the detection time Ta and the detection time Ta' when received from the index data detectors 63a, 63b, thereby obtaining a time difference (a time delay difference) in terms of transferring the data between the transfer paths P1 and P2. The time delay difference calculating unit 61 then inputs this time difference to the control unit 62.

As shown in FIG. 8, the control unit 62, when judging in step S402 that the time delay difference has been inputted from the time delay difference calculating unit 61, is stored with data on the time delay difference thereof in step S403. Excluding the points that have been described above, the transfer path control system in the embodiment 4 is substantially the same as the transfer path control system in the embodiment 1.

The time delay difference data stored in the control unit 62 is outputted corresponding to a request given from the manager etc of the transfer path control system.

Note that the transfer device 50 shown in FIG. 7 corresponds to a second transfer device and a transfer device stated otherwise according to the present invention, and the transfer device 60 corresponds to a second transfer device and a transfer device stated otherwise according to the present invention. Further, the index data inserting unit 51 corresponding to an index data adding unit in the present invention, the index data detector 63*a* corresponds to a first time detecting unit in the present invention, the index data detector 63*b* corresponds to a second time detecting unit in the present invention, and the time delay difference calculating unit 61 corresponds to a time difference calculating unit in the present invention. Moreover, the selector 26 and the control unit 62 correspond to a selection unit according to the present invention, the control unit 62 corresponds to a selection unit, a judging unit and a time difference storage unit in the present invention.

The transfer path control system in the embodiment 4 has, in addition to the same effects as those in the embodiment 1, an advantage in which the time delay difference data can be utilized when forming the architecture of the network system and building up a new transfer path. Note that it may also be judged based on the time difference obtained by the time delay difference calculating unit 61 whether or not the no-error switching can be implemented.

Embodiment 5

Figure 9:
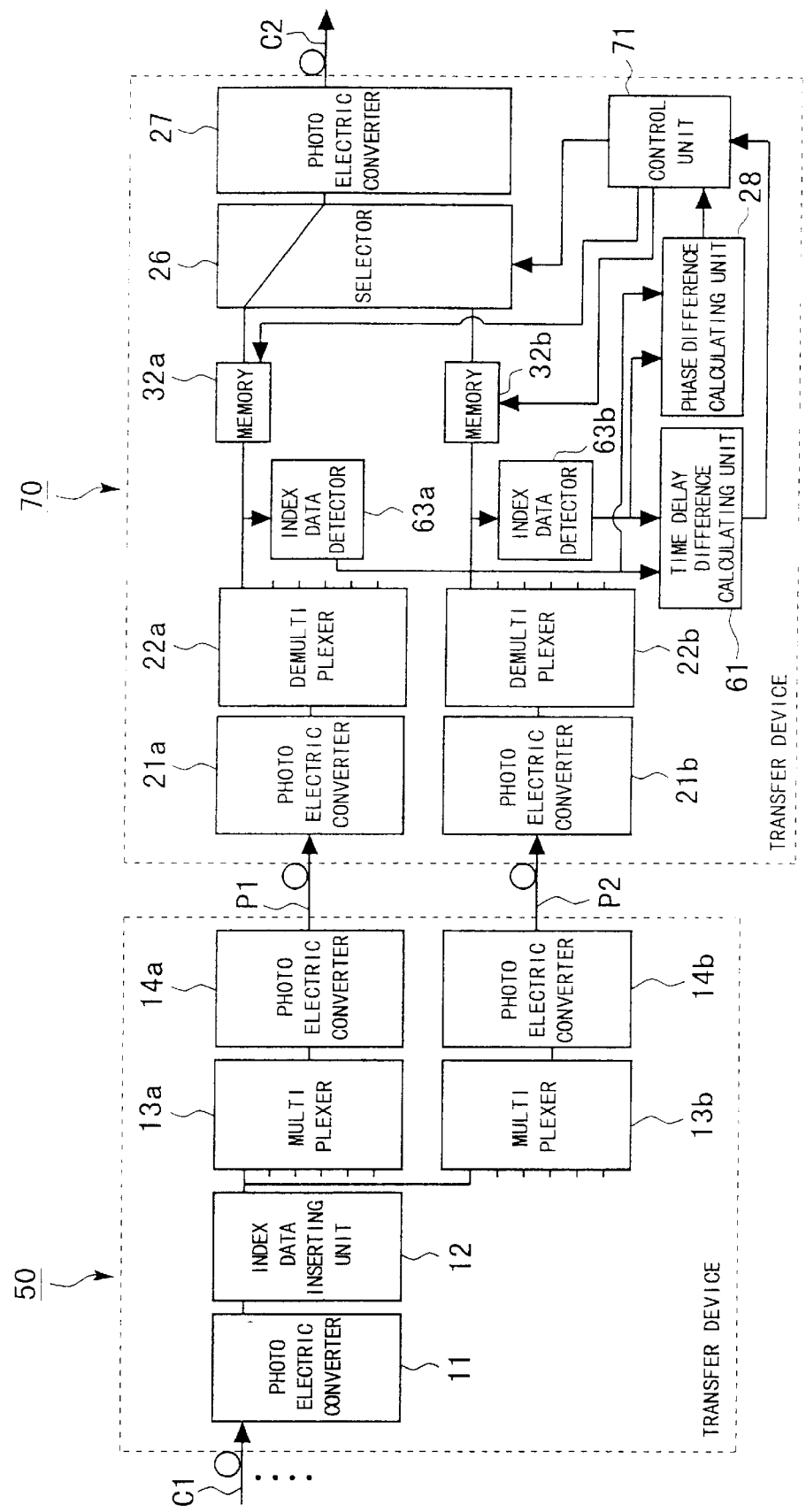
FIG. 9 is a diagram showing a structure of the transfer path control system in an embodiment 5 of the present invention.
Figure 10:
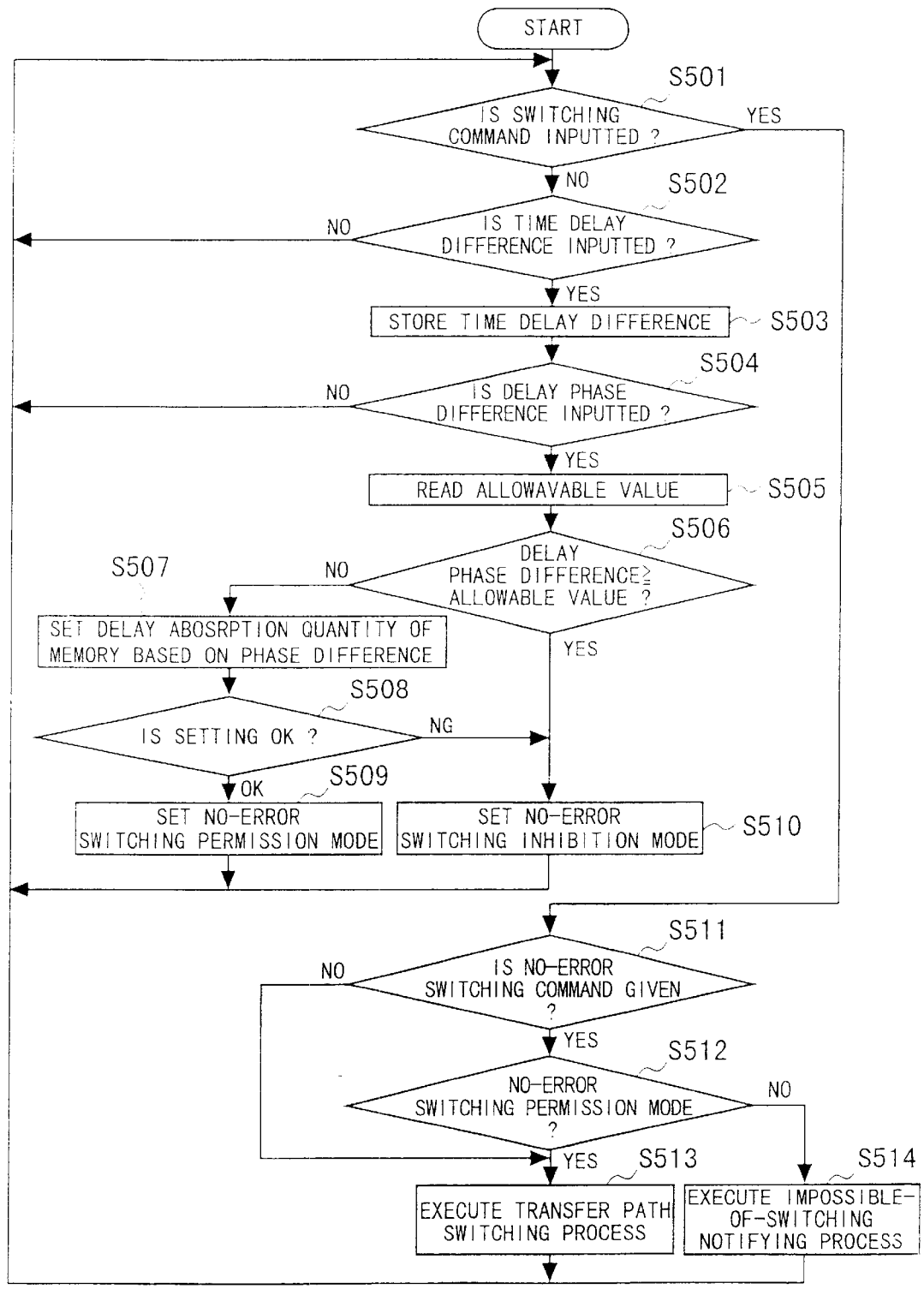
FIG. 10 is a flowchart showing processes executed by a control unit shown in FIG. 9.

FIG. 9 is a diagram showing an architecture of the transfer path control system in an embodiment 5 of the present invention. FIG. 10 is a flowchart showing processes executed by a control unit 71 shown in FIG. 9. As shown in FIGS. 7 and 8, the embodiment 5 is based on a combination of the transfer path control system in the embodiment 4 and a configuration for eliminating the phase difference controller 25 explained in the embodiment 2.

Note that the transfer device 70 shown in FIG. 9 corresponds to a second transfer device and a transfer device stated otherwise according to the present invention, the selector 26 and the control unit 71 correspond to a selection unit in the present invention, and the control unit 71 corresponds to a judging unit and a capacity changing unit according to the present invention.

The transfer path control system in the embodiment 5 has, in addition to the effects given by the transfer path control system in the embodiment 4, an advantage of being capable of eliminating the phase difference controller 25.

Embodiment 6

Figure 11:
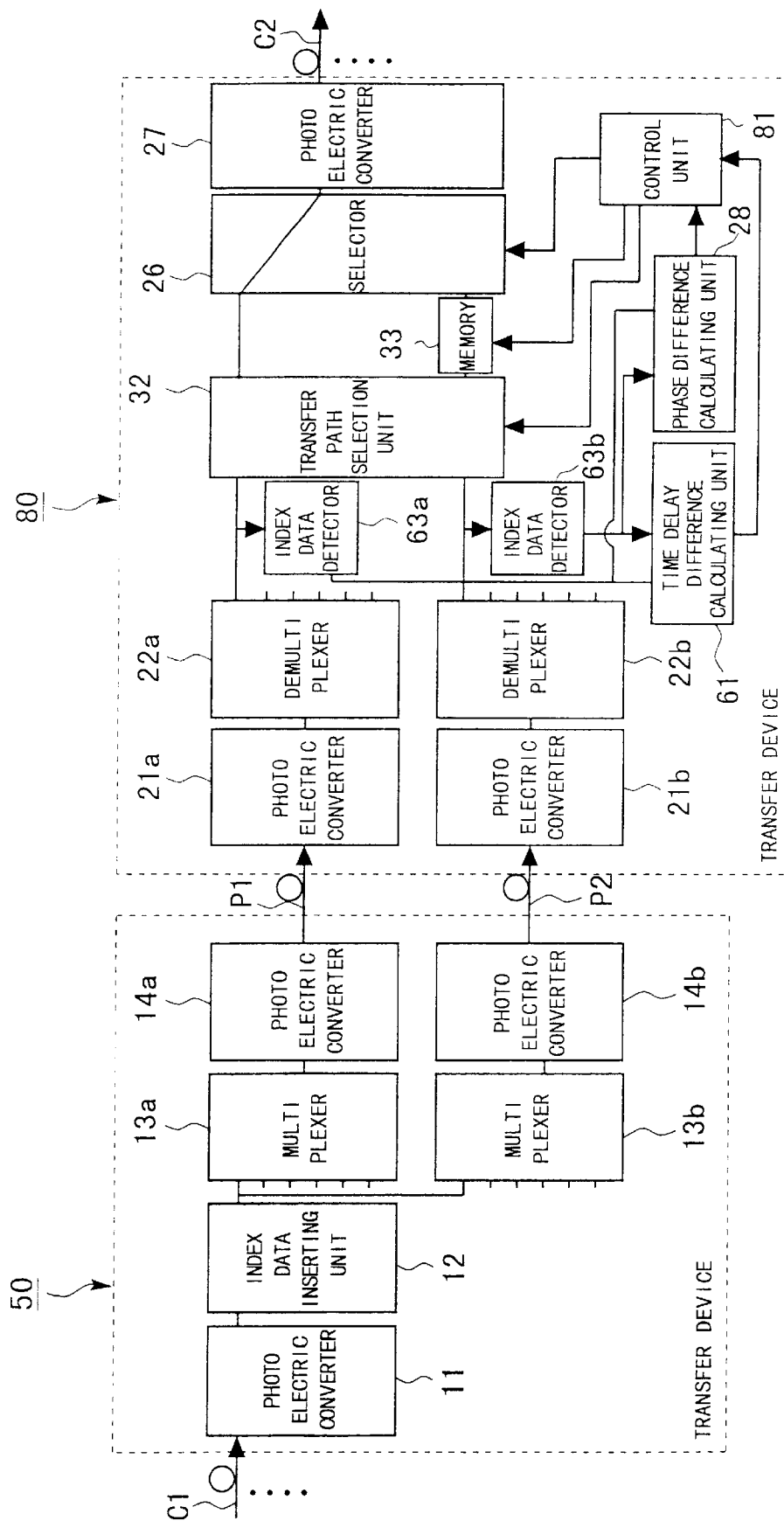
FIG. 11 is a diagram showing a structure of the transfer path control system in an embodiment 6 of the present invention.
Figure 12:
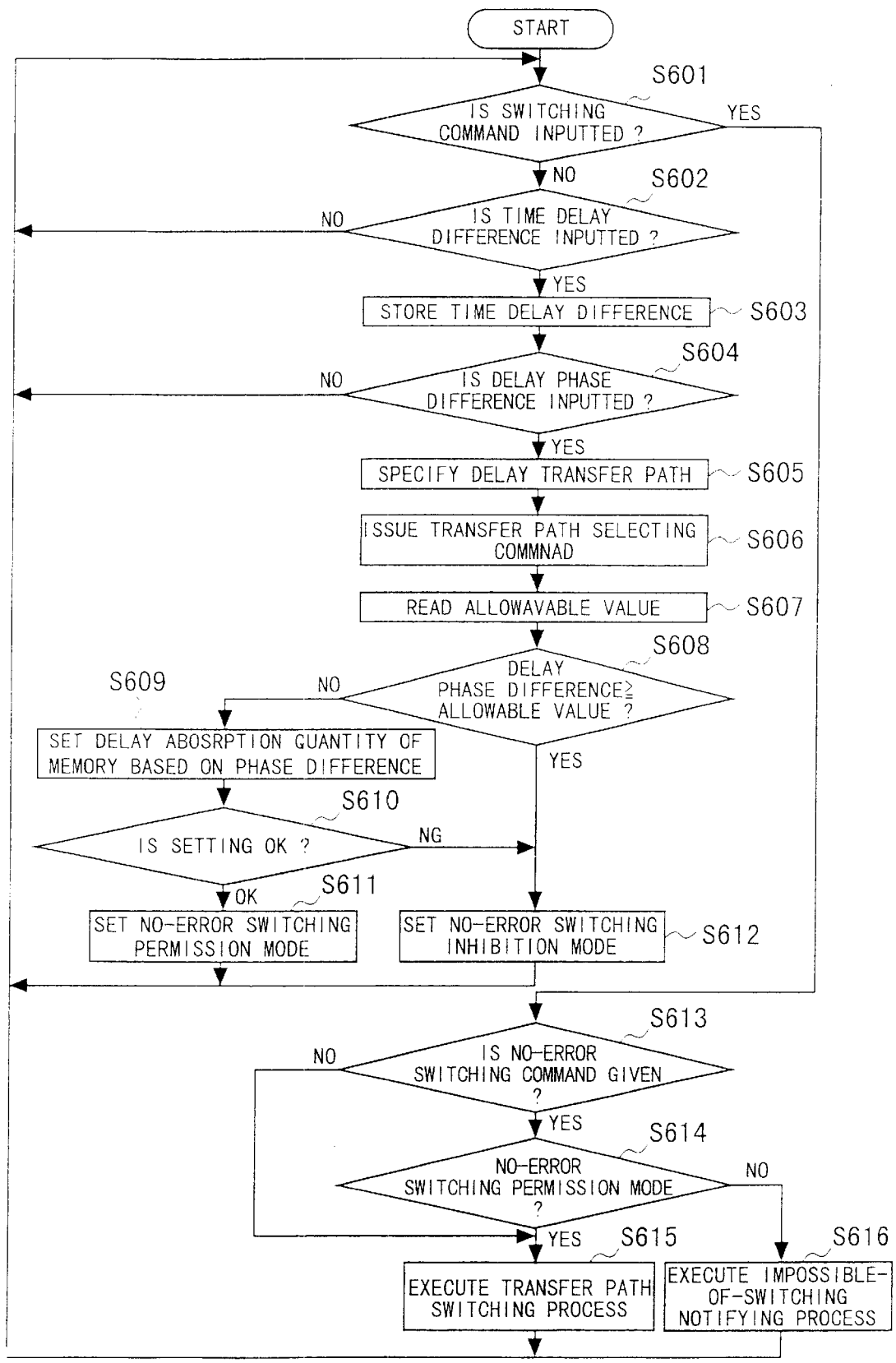
FIG. 12 is a flowchart showing processes executed by a control unit shown in FIG. 11.
Figure 14:
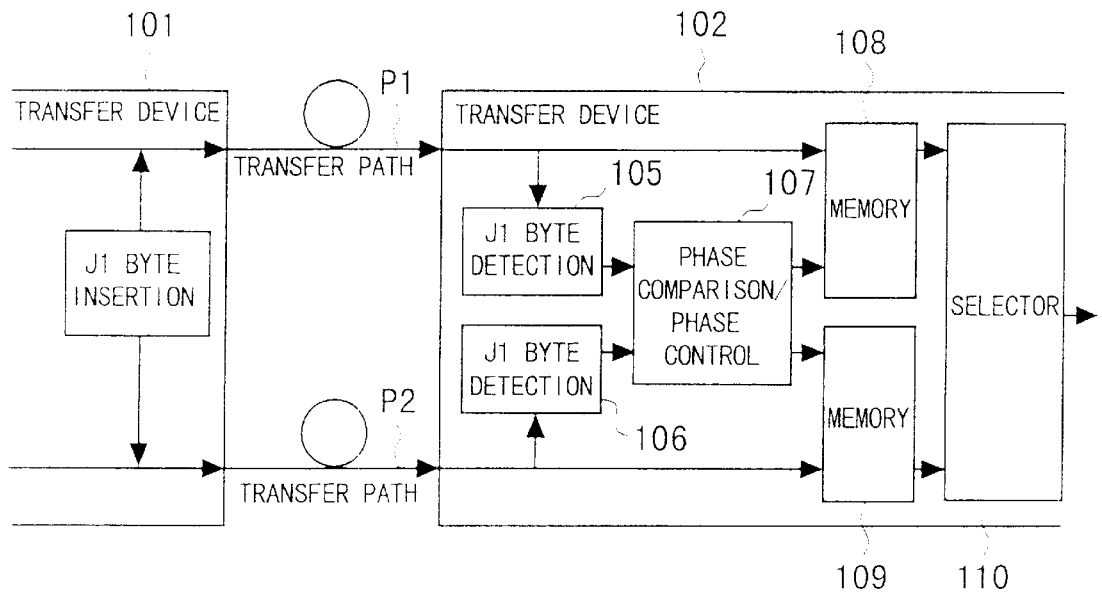
FIG. 14 is a diagram illustrating an architecture of a transfer path control system in the prior art.
Figure 15:
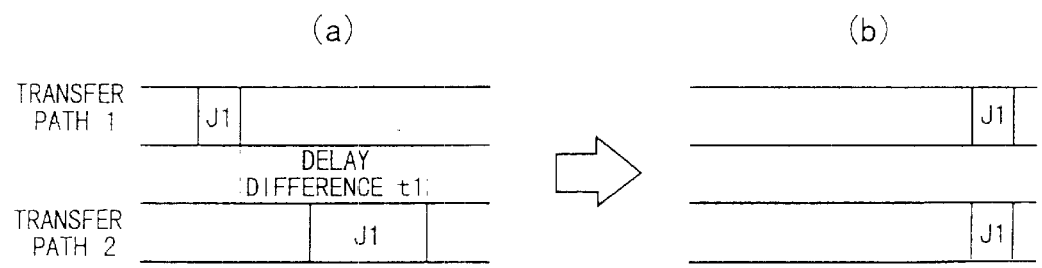
FIG. 15 is an explanatory diagram of the transfer path control system shown in FIG. 14.

FIG. 11 is a diagram showing an architecture of the transfer path control system in an embodiment 6 of the present invention. FIG. 12 is a flowchart showing processes executed by a control unit 81 shown in FIG. 11. As shown in FIGS. 11 and 12, the embodiment 6 is based on a combination of the transfer path control system in the embodiment 4 and a configuration for reducing the number of the memories for the phase control explained in the embodiment 3 down to one.

Note that a transfer device 80 shown in FIG. 11 corresponds to a second transfer device and a transfer device stated otherwise according to the present invention, a transfer path selection unit 32 and the control unit 81 correspond to a selection unit in the present invention, and the control unit 81 corresponds to a selection unit, a specifying unit and a capacity changing unit according to the present invention.

The transfer path control system in the embodiment 6 has, in addition to the effects given by the transfer path control system in the embodiment 4, an advantage in which a less number of memories may suffice.

This invention being thus described, it will be obvious that some may be varied in various ways. Such variations are not to be regarded as departure from the spirit and scope of the invention, and all such modifications would be obvious for one skilled in the art intended to be included within the scope of the following claims.

What is claimed is:

1. A transfer path control system comprising:

a first transfer device; and a second transfer device connected to said first transfer device through a first transfer path and a second transfer path for transferring the same data, said first transfer device comprising:

an index data adding unit adding index data to each piece of data transmitted to said first transfer path and said second transfer path, said second transfer device comprising:

a selection unit selecting one of said first transfer path and said second transfer path and, when receiving the same data through said first transfer path and said second transfer path, transmitting only the data corresponding to the selected transfer path;

a first detecting unit detecting the index data from the data having arrived at said second transfer device through said first transfer path;

a second detecting unit detecting the index data from the data having arrived at said second transfer device through said second transfer path;

a phase difference detecting unit detecting a phase difference between said first transfer path and said second transfer path on the basis of respective pieces of index data detected by said first detecting unit and said second detecting unit; and a judging unit judging whether or not said One transfer path selected by said selection unit can be switched over to another transfer path in accordance with the phase difference detected by said phase difference detecting unit.

2. A transfer path control system according to claim 1, wherein said index data adding unit adds specified index data to the communications data, and said second transfer device comprises:

a first time detecting unit detecting, as a first time, a time when said first detecting unit detects the specified index data from the data transferred through said first transfer path;

a second time detecting unit detecting, as a second time, a time when said second detecting unit detects the specified index data from the data transferred through said second transfer path;

time difference calculating unit obtaining a time difference between the first time and the second time; and a time difference storage unit storing the time difference calculated by said time difference calculating unit.

3. A transfer path control system according to claim 1, wherein said second transfer device further comprises a switching control unit switching over the transfer path selected by said selection unit to said another transfer path only when said judging unit judges that the switch-over can be carried out.

4. A transfer path control system according to claim 3, wherein said switching control unit operates in accordance with a switching command inputted to said second transfer device.

5. A transfer path control system according to claim 1, wherein said second transfer device further comprises:
   a first buffer storing the data having arrived at said second transfer device through said first transfer path;
   a second buffer storing the data having arrived at said second transfer device through said second transfer path; and
   a capacity changing unit changing a capacity of one of said first buffer and said second buffer in accordance with a phase difference detected by said phase difference detecting unit so that the same data stored respectively in said first buffer and said second buffer are substantially simultaneously given to said selection unit.

6. A transfer path control system according to claim 1, wherein said second transfer device further comprises:
   a specifying unit specifying, when the same data are transmitted from said first transfer device simultaneously to said first transfer path and said second transfer path, said transfer path through which the same data arrives earlier at said second transfer device;
   a buffer storing the data having arrived at said second transfer device through said transfer path specified by said specifying unit; and
   a capacity changing unit for changing, if the same data as the data stored in said buffer arrives at said second transfer device through said transfer path which is not specified by said specifying unit, a capacity of said buffer in accordance with a phase difference detected by said phase difference detecting unit so that the same data having arrived at said second transfer device and the same data stored in said buffer are substantially simultaneously given to said selection unit.

7. A transfer device connected to another transfer device through a first transfer path and a second transfer path for transferring the same data, comprising:
   a selection unit selecting one of said first transfer path and said second transfer path and, when receiving the same data from said another transfer device through said first transfer path and said second transfer path, transmitting only the data corresponding to the selected transfer path;
   a first detecting unit detecting index data contained in the data transferred through said first transfer path;
   a second detecting unit detecting index data contained in the data transferred through said second transfer path;
   a phase difference detecting unit detecting a phase difference between said first transfer path and said second transfer path on the basis of respective pieces of index data detected by said first detecting unit and said second detecting unit; and
   a judging unit judging whether or not said one transfer path selected by said selection unit can be switched over to said another transfer path in accordance with the phase difference detected by said phase difference detecting unit.

8. A transfer device according to claim 7, further comprising:
   a first time detecting unit detecting, as a first time, a time when said first detecting unit detects the specified index data contained in the data transferred through said first transfer path;
   a second time detecting unit detecting, as a second time, a time when said second detecting unit detects the specified index data contained in the data transferred through said second transfer path;
   a time difference calculating unit obtaining a time difference between the first time and the second time; and
   a time difference storage unit storing the time difference calculated by said time difference calculating unit.

9. A transfer path control method of a transfer path control system comprising, a first transfer device; and a second transfer device connected to said first transfer device through a first transfer path and a second transfer path for transferring the same data, said second transfer device comprising a selection unit selecting one of said first transfer path and said second transfer path and, when receiving the same data through said first transfer path and said second transfer path, transmitting only the data corresponding to said selected transfer path, said method comprising steps of:
   adding index data to respective pieces of data transmitted by said first transfer device to said first transfer path and said second transfer path;
   detecting the index data from the data having arrived at said second transfer device through said first transfer path;
   detecting the index data from the data having arrived at said second transfer device through said second transfer path;
   detecting a phase difference between said first transfer path and said second transfer path on the basis of respective pieces of index data detected; and
   judging whether o not said one transfer path selected at the present time can be switched over to another transfer path in accordance with the phase difference detected.

10. A transfer path control method according to claim 9, further comprising:
   a step of adding specified index data to the communications data transmitted by said first transfer device to said first transfer path and said second transfer path;
   a step of detecting, as a first time, a time when the specified index data is detected from the communications data transferred through said first transfer path;
   a step of detecting, as a second time, a time when the specified index data is detected from the communications data transferred through said second transfer path;
   a step of obtaining a time difference between the first time and the second time; and
   a step of storing the obtained time difference.

11. A transfer path control method according to claim 9, wherein said one transfer path is switched over to said another transfer path only when judging that the instantaneous switch-over can be carried out.

12. A transfer path control method according to claim 11, wherein the process of switching over said one transfer path to said another transfer path is started in accordance with a is switching command inputted to said second transfer device.

13. A transfer path control method according to claim 9, further comprising steps of:
   storing a first buffer with the communications data having arrived at said second transfer device through said first transfer path;

storing a second buffer with the communications data having arrived at said second transfer device through said second transfer path; and changing a capacity of one of said first buffer and said second buffer in accordance with a detected phase difference so that the same data stored respectively in said first buffer and said second buffer are substantially simultaneously given to said selection unit.

14. A transfer path control method according to claim 9, further comprising steps of:

specifying, when the same data are transmitted from said first transfer device simultaneously to said first transfer path and said second transfer path, a transfer path through which the same data arrives earlier at said second transfer device within said first transfer path and said second transfer path;

storing a buffer with the data having arrived at said second transfer device through said transfer path specified; and changing, if the same communications data as the communications data stored in said buffer arrives at said second transfer device through said transfer path which is not specified, a capacity of said buffer in accordance with a detected phase difference so that the same communications data having arrived at said second transfer device and the same data stored in said buffer are substantially simultaneously given to said selection unit.

15. A transfer path control system comprising:

a first transfer device; and a second transfer device connected to said first transfer device through a first transfer path and a second transfer path for transferring the same data, said first transfer device comprising:
an index data adding unit adding index data to each piece of data transmitted to said first transfer path and said second transfer path, said second transfer device comprising:
a selection unit selecting one of said first transfer path and said second transfer path and, when receiving the same data through said first transfer path and said second transfer path, transmitting only the data corresponding to the selected transfer path;

a first detecting unit detecting the index data from the data having arrived at said second transfer device through said first transfer path;

a second detecting unit detecting the index data from the data having arrived at said second transfer device through said second transfer path;

a phase difference detecting unit detecting a phase difference between said first transfer path and said second transfer path on the basis of respective pieces of index data detected by said first detecting unit and said second detecting unit; and a judging unit judging whether the phase difference detected by said phase difference detecting unit can be absorbed or not.

* * * * *

UNITED STATES PATENT AND TRADEMARK OFFICE
CERTIFICATE OF CORRECTION

PATENT NO. : 6,680,905 B1
DATED : January 20, 2004
INVENTOR(S) : T. Ishikawa et al.

It is certified that error appears in the above-identified patent and that said Letters Patent is hereby corrected as shown below:

Column 14,
Line 60, should read, -- a time difference calculating unit obtaining a time dif- --

Column 16,
Line 36, should read, -- judging whether or not said one transfer path selected at --

Signed and Sealed this

Eleventh Day of May, 2004

JON W. DUDAS
*Acting Director of the United States Patent and Trademark Office*